2 Sheets--Sheet 1.
H. BRYANT.
Improvement in Armillary Spheres.
No. 131,148.      Patented Sep. 10, 1872.
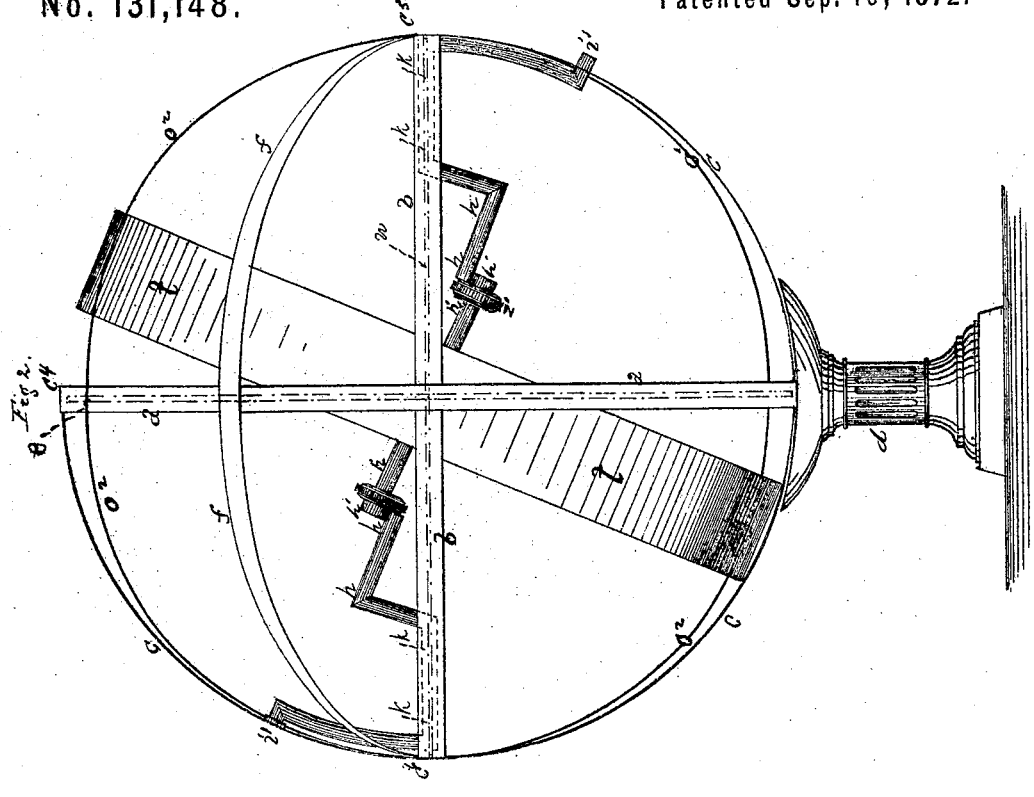
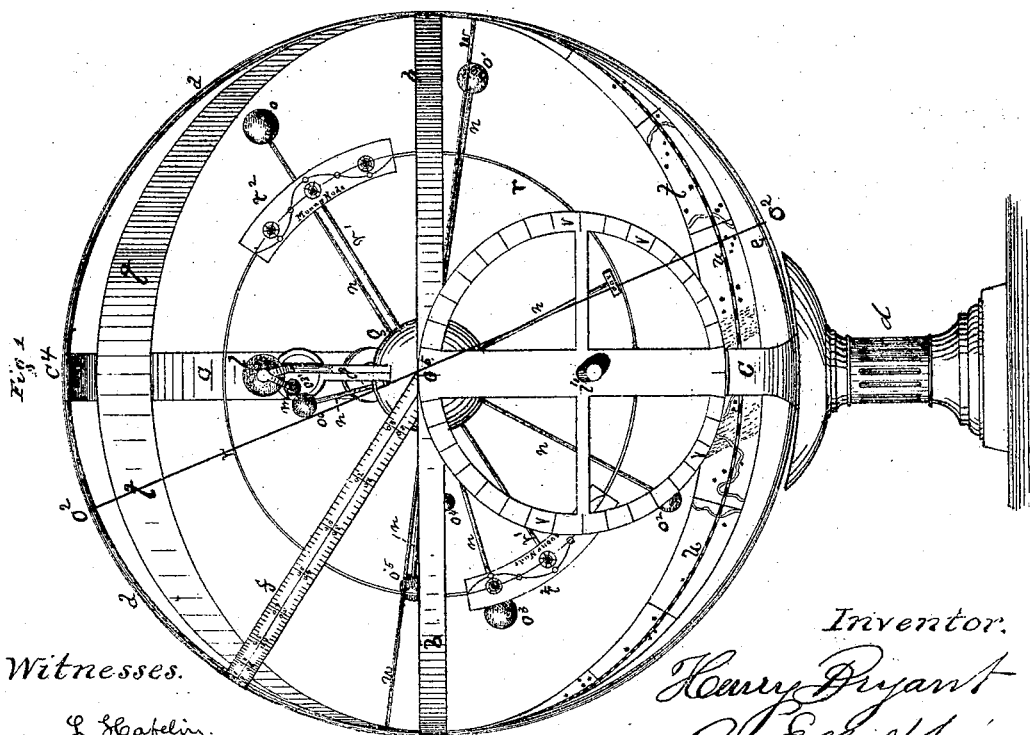
Witnesses.
Inventor.

2 Sheets--Sheet 2.
H. BRYANT.
Improvement in Armillary Spheres.
No. 131,148. Patented Sep. 10, 1872.
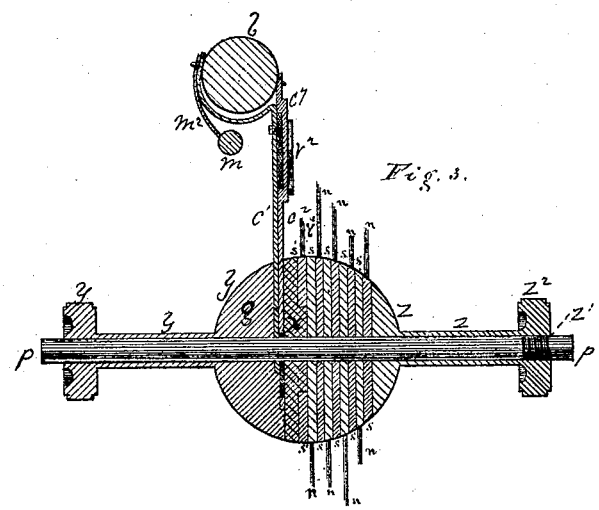
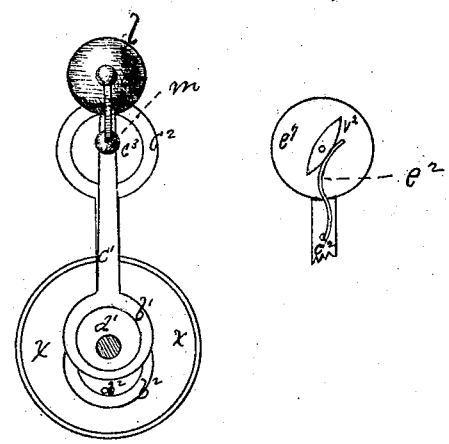
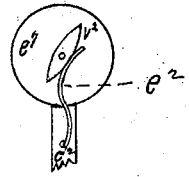

UNITED STATES PATENT OFFICE.

HENRY BRYANT, OF HARTFORD, CONNECTICUT, ASSIGNOR TO THE BRYANT CELESTIAL INDICATOR COMPANY, OF SAME PLACE.

IMPROVEMENT IN ARMILLARY SPHERES.

Specification forming part of Letters Patent No. 131,148, dated September 10, 1872.

SPECIFICATION.

I, HENRY BRYANT, of Hartford, in the county of Hartford and State of Connecticut, have invented an Improved Celestial Indicator, of which the following is a specification:

Nature and Objects of the Invention.

My invention is an instrument for use in schools, colleges, and the like, for illustrating and explaining various celestial phenomena, such as are commonly the subject of study and investigation in pursuing the study of astronomy.

Description of the Accompanying Drawing.

Figure 1 is an elevation, which I term, for convenience sake, a front elevation. Fig. 2 is an elevation, which I term a side elevation, the observer being faced at a right angle to his position, as indicated in Fig. 1. Fig. 3 is a detached sectional view of a portion of the apparatus, representing the solar system. Fig. 4 is a detached view of the apparatus, whose office it is to keep the axis of the earth at all times parallel to the axis of the heavens. Fig. 5 is a detached view of the reverse side of the part of the apparatus shown in Fig. 4, and the office of this figure is to show a device for continuing a rotary motion past the two points commonly known as "dead-centers."

General Description.

The letters $a$ and $b$ indicate two rings or circles of thin sheet metal, crossing each other at right angles, and fastened together at the points of intersection. $c$ is a third ring, whose plane is at a right angle to the planes of both the other rings, and fastened to them at the points of intersection. A quarter of this ring, from $c^4$ to $c^5$, is cut out for convenience sake. The sphere bounded by these rings or circles represents the sphere of the heavens, and the whole is firmly fastened to the foot $d$. The ring $a$ represents the equator of the heavens, which is also represented by a wire-ring, $e$, seen in dotted lines in Fig. 2, which lies just inside the ring $a$, and is capable of being revolved, as will hereinafter appear. The ring or celestial equator $a$ is marked off into divisions for the ready measurement of right ascension, $b$, meanwhile, representing the first meridian of the heavens. There is a movable meridian, $f$, pivoted at $c^5$ and $c^6$, which can be swung around the whole sphere, except past the foot $d$, and, as it is properly graduated, declination can be read off upon it at sight; and by bringing it to cover any particular spot on the sphere the declination and right ascension can be readily read off at sight. The ball $g$ in the center represents the sun; $h\ h$, the axis of the same. $i\ i$ is the axis of the ecliptic; $k\ k$, seen in dotted lines in Fig. 2, through the first meridian $b$—the axis of the heavens. All of these axes are attached together at the proper angle of variation to each other, and the axes of the sun and of the heavens turn about the pole of the ecliptic, represented as at $i'\ i'$. The letter $l$ indicates the earth, about which the moon $m$ revolves. The other planets are indicated by the letters $o\ o^1\ o^2\ o^3\ o^4\ o^5\ o^6$, which are attached by the wires $n$, of proper lengths to show their relative distances from the sun, to disks $s$, which are capable of being revolved upon the axis $p$ by an arrangement which will be more particularly described hereinafter. The wire-ring $r$ represents the moon's path around the sun, and the shape of the whole ring is such, and it is so placed upon its supports $r^1\ r^1$, as to show the eccentricities of its path. Attached to this ring $r$ are two flat plates of metal, $r^2\ r^2$, to represent the moon's nodes, and so engraved as to show where the paths of the earth and moon about the sun intercept each other. The broad metal band $t$ represents the zodiac properly inclined to the plane of the celestial equator; on the middle of the inside is marked the line $u$ to represent the ecliptic, and properly divided to show the signs. The circle $v$ represents the path described by the revolution of the axis of the heavens about the axis of the ecliptic, and is divided into degrees for the ready measurement of this movement. The wire-ring $e$, already spoken of, which represents the celestial equator, is crossed at right angles by the wire-ring $w$, which represents a meridian, and the two are fastened together at the points of intersection, which points of intersection represent the equinoxes. The wire-ring $w$ is fastened to the axis of the heavens at the points where it intersects such axis; and when the pole of the heavens, which is now at $c^2$, is revolved to the right or westward, the equinoxes will be seen to fall back on the ecliptic, so as to illustrate and explain the precession of the equinoxes. This motion also illustrates the movement of the equator of the heavens, thus changing the declination of the stars.

I will now explain the parts which are more particularly shown in Figs. 3, 4, and 5. The axis $p$ is fastened rigidly into the sockets $h'$ $h'$. The disk $x$ is rigidly fastened to the shaft $p$, and has a shoulder upon which the disk $s'$, which supports the moon's nodes, turns. The other disks turn upon the shaft $p$. The letter $z$ indicates a nut inclosing the shaft $p$, and turning upon it with a screw-thread, $z^1$, for turning the nut up against the disks and fastening them in place. This nut has a milled surface at $z^2$ for the thumb and finger, by which it can be turned. Upon the opposite end of the shaft $p$ is the thumb-piece $y$, operating similarly to the nut $z$, except that it has no screw-thread, and does not act as a tightener. Upon the side of the disk $x$, which is toward the thumb-piece $y$, are two cams, $a^1$ and $a^2$, the former overlying the latter, both equidistant from the center of the disk $x$, and upon exactly-opposite sides of the center. A collar, $b^1$, which is a part of the arm $c^1$, surrounds the cam $a^1$, and a collar, $b^2$, which is a part of the arm $c^2$, surrounds the cam $a^2$. These arms $c^1$ $c^2$ lie in a slot in the disk part of the thumb-piece $y$, and, as the thumb-piece is revolved, the arms $c^1$ $c^2$ are carried with it, and the effect of their attachment to the cams $a^1$ $a^2$ is such as to cause them to work out and in, alternately. Of course, at two points in each revolution the arms will (supposing them to be of equal length) project equally from the surface of the sun $g$. The end of the arm $c^2$ supports one (the south) pole of the earth. The bent end of the arm $c^1$ supports the opposite pole. The arm $c^2$ contains a revolving disk, $c^3$, to which is attached, at a distance from its center corresponding to the action of the cams $a^1$ $a^2$, the arm $c^1$ by a screw-pin running through a slot in the arm; and now (look at Fig. 3) supposing the earth to be at one of the equinoxes and its axis to be parallel to the axis of the heavens, the action of the whole device, as the thumb-piece $y$ is rotated, is to keep the two poles of the earth parallel to themselves at all times. By this device, also, the disk $c^3$ is made to revolve backward, causing the north pole of the earth to describe a small ellipse in a backward direction from its direct motion, thus representing the earth's nutation.

It will be observed that in the course of a revolution the arms will reach two points familiarly known as dead-centers, and this mechanical difficulty it is necessary to overcome. It is done (see Fig. 5) by a cam, $v^2$, fastened to the axis of the revolving disk $c^3$, upon the back side—so to speak—of the disk, which, just before it gets to these centers, presses against the flat spring $e^2$, which spring is fastened to the back side of the arm $c^2$, and presses by the spring, and immediately after the end of the cam presses by the spring will throw it past the center. There is a thin round collar in the arm $c^2$ which encircles the revolving disk $c^3$, and to the back side of this collar the thin round plate $c^7$ is fastened, a hole through the center of which serves as a bearing for the axis of the revolving disk $c^3$, and it is on the back side of this plate $c^7$ that the cam $a^2$ revolves. The line $o^2$ indicates the milky-way. The small plate marked "100" represents the asteroids. The arm $m^2$, which carries the moon, is attached to the bent end of the arm $c^1$ at such a place and in such a manner as to show the eccentric and peculiar orbit of the moon about the earth. The circumference of the disk $x$ is divided into thirty-seven (37) equal parts to denote the semi-annual falling back of the moon's nodes.

*Claims.*

1. In combination with the stationary rings $a$ $b$ $t$, representing the celestial equator, meridian, and ecliptic, the movable frame $e$ $w$, representing the perpetual celestial equator and meridian revolving around the ecliptical axis $i$.

2. The whole shaft composed of the axis $i$, axis $h$, and the axis $k$, arranged relatively to each other at the proper angles of variation, for the purpose set forth.

3. The combination of the shaft, as described in the immediately preceding claim, with the ring $c$, turning in the same and having the bearings at the poles of the ecliptic $i'$ $i'$, substantially as and for the purpose set forth.

4. The combination of the shaft $p$, disk $x$, the nut $z$, and the disks $s'$ $s$ $s$ $s$ $s$ $s$ $s$ $s$, supporting the planets and asteroids, substantially as and for the purposes set forth.

5. The combination of the arms $c^1$ $c^2$, revolving disk $c^3$, cam $v^2$, and spring $e^2$, constructed substantially as and for the purposes set forth.

6. The combination of the shaft $p$, thumb-piece $y$, disk $x$, cams $a^1$ $a^2$, and arms $c^1$ $c^2$, constructed substantially as and for the purposes set forth.

HENRY BRYANT.

Witnesses:
WM. E. SIMONDS,
E. B. FARNHAM.